Patented Oct. 31, 1939

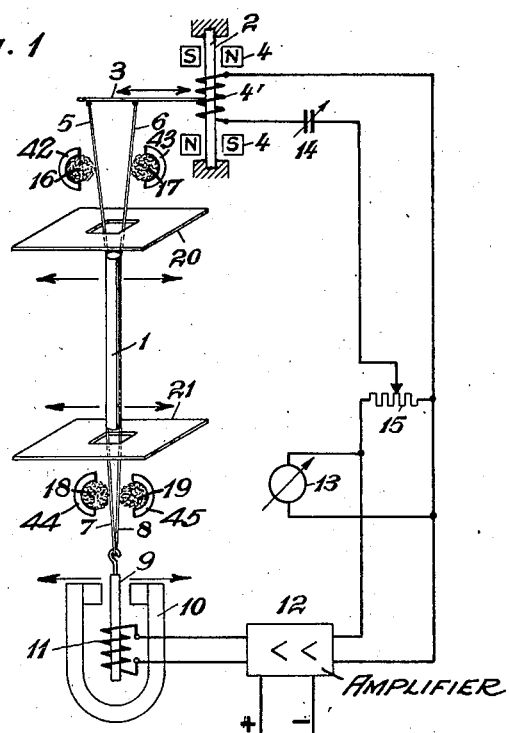
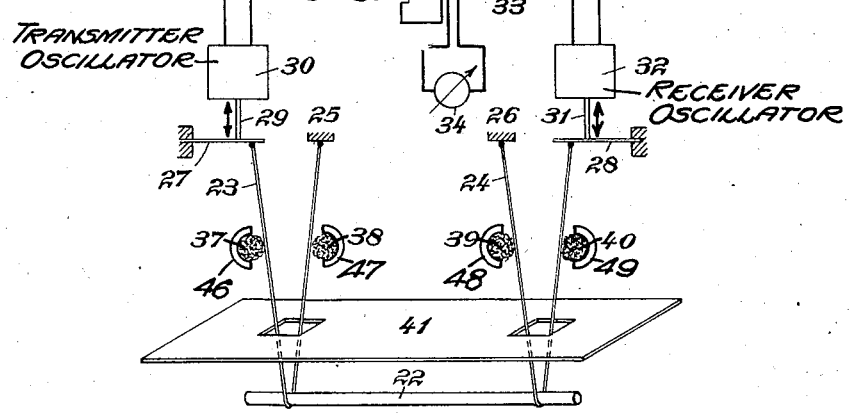

2,178,252

UNITED STATES PATENT OFFICE 2,178,252

APPARATUS FOR TESTING THE MECHANICAL OSCILLATION PROPERTIES OF BODIES

Fritz Förster, Stuttgart, Germany, assignor to Siemens & Halske, Aktiengesellschaft Siemensstadt, near Berlin, Germany, a corporation of Germany Application May 20, 1937, Serial No. 143,721
In Germany May 18, 1936

6 Claims. (Cl. 73—51)

My invention relates to an arrangement for testing the mechanical oscillation properties of bodies in which the body to be tested is so set into oscillation as to enable the determination of the nature and properties of the body to be tested.

The object of my invention is to provide an arrangement of the above-indicated character, whereby the body to be tested is supported and set into oscillation practically without damping and the oscillations of the body are transmitted to a receiver without causing any reaction and without the oscillation or the inner consumption of energy of the body to be tested being thereby influenced.

The method hitherto employed in determining the inner friction and energy consumption of bodies consisted in fixing one end of rod-like test bodies and in setting the free end thereof into oscillation. In this case the inner consumption of energy of the test bodies may be determined from the phase displacement between the oscillations of two cross-sections spaced apart, for instance, a distance equal to half the length of the rod. By this method only rod-like bodies may be tested and it is not possible to check thereby to what extent the damping is influenced when the rod is fixed at one end. Furthermore, the method cannot be employed for determining the oscillation properties of the test body but only for testing its inner consumption of energy.

According to the invention the oscillation properties of bodies may be far better and more accurately determined by employing an arrangement in which the body to be tested is supported in a holder, whose mass is very small as compared to that of the test body and which has practically no damping reaction on the body. This may be accomplished according to the invention in a particularly simple manner by suspending the test body on thin wires, threads or bands. The dimensions of these supporting elements may be chosen without giving rise to any difficulties in such a manner that no appreciable additional damping is caused by the suspension elements in the case of the small amplitudes of oscillation sufficient to carry out the tests.

The method according to the invention for supporting the body makes it possible to check the oscillation properties of the body in different respects by the use of simple means. First of all the natural frequency of the body and the harmonic vibrations of the frequency may be easily determined with very great acuracy and then it may be readily concluded therefrom whether two supposedly similar bodies have actually and exactly the same shape, i. e., whether, for instance, a body to be tested differs from a standard shape. The departures of a body of rotation from symmetry may be determined with great accuracy (for instance the bend of the axis of a cylinder or tube, the unsymmetrical position of a bore within a solid body of rotation and the like).

When comparing by these tests several bodies of similar shape it is possible to conclude from the differences in the number of oscillations of the bodies also differences in the chemical composition, or in the case of an equal chemical composition differences in the crystalline structure may be ascertained.

The inner energy consumption may also be tested with the aid of the above-mentioned known method. To this end, the resonance curve is determined and from this curve the inner energy consumption may be directly deducted. The measurement of this consumption is of particular importance if, for instance, cracks or mechanical stresses are to be determined, for by the presence of such faults the inner energy consumption is varied considerably.

Owing to the accuracy of the novel testing arrangement it has been found that when taking measurements of the inner energy consumption of cylindrical test bodies even small departures from the circular cross-section result in two resonance curves lying so close to one another, that they are likely to be plotted as a single broad resonance curve whereby the inner energy consumption of the test body might appear to be greater than is actually the case. To avoid this, the natural frequency is first determined, for the purpose of ascertaining the inner energy consumption, and then two natural frequencies, separated far apart in value, are produced, for instance, by producing a flat surface (for instance, by planing) on the test rod, so that its cross section assumes a segmental form.

Since by the arrangement according to the invention both the natural frequency and the inner energy consumption may be measured it is, for instance, possible to ascertain whether a desired heat treatment has been properly carried out. Thus, for instance, the frequency decreases with increasing hardening temperature of carbon steel, whereas the inner energy consumption increases. Both values may, therefore, be prescribed for a material of a given shape and faulty hardenings may be detected by taking measurements with the aid of the arrangement according to the invention. In this manner the products when put to their intended use can be subjected to higher stresses. In the case of a work piece not hardened throughout, the depth of the proper hardening may be determined and also with case hardened steels the depth of the case hardened layer. With malleable cast iron it may be ascertained how successful the heat treatment has been performed regarding the decomposition of the cementite and the degassing of the carbon.

When sintering metal alloys, ceramic materials and other pulverized substances the results of the sintering or of the firing process may be controlled by measuring the natural oscillations and the inner energy consumption.

Owing to the strong effects of inner stresses on the inner energy consumption the measurement of this consumption lends itself to the investigation of deformations and of the recrystallisation which neutralizes the effect of the deformations.

The possibility of testing work pieces for cracks renders the subject matter of the invention suitable for checking welded joints as to a faulty bond and cast iron pieces as to cracks, pipes and the like.

The invention is also particularly suitable for checking innner processes which take place within the work pieces through changes in temperature. Since the body to be tested is connected, for instance, merely by thin wires to the testing apparatus the temperature of the test body may be raised to considerable values (1000°) by individual heating, and the progress of processes may be observed by precise measurements, not possible to carry out by the methods hitherto known.

The simplest form of the invention consists in suspending the rod to be tested on a measuring element with the aid of two or more wires secured to one end of the rod. In this case the oscillations of the rod may be produced by striking the same. However, the oscillations of the test body may also be produced by an oscillator which is connected to one end of the test body by two or more wires.

In the above-described manner both, longitudinal and transversal oscillations may be utilized for the testing. By the use of a constantly acting excitation the test body may also be impressed with forced oscillations. Of course, the amplitudes of these forced oscillations will attain measurable values only in the neighborhood of the natural frequencies. However, this is sufficient for recording, for instance, the resonance curve of a test rod.

Further details of my invention will be apparent from the following description in connection with the accompanying drawing which portrays diagrammatically in Figs. 1 and 2 two test methods.

Referring to Fig. 1, an electromagnetic oscillation generator is provided which consists of a flexible armature 2 fixed at both ends so that it can perform only transverse oscillations, of a rod 3 secured to the central portion of the armature 2 and extending at right angles thereto, of a permanent magnet system 4, whose pole pieces as shown are arranged at opposite sides of the armature 2, and of a coil 4' surrounding the armature 2. Upon the energization of the coil 4' with alternating current, the armature 2 is alternately magnetized at its ends at opposite polarities. Accordingly, for instance when its upper end has north polarization and its lower end south polarization, it is attracted and repelled at both ends to the left by the magnet system S, N and N, S, and when reverse polarization occurs, it is attracted and repelled at both ends to the right. Thus the armature carries out transverse bending oscillations with the result that the rod 3 oscillates in the longitudinal direction indicated by the double pointed arrow. These oscillations are transmitted to the body to be tested by the wires 5 and 6 connecting the rod 3 with the upper end of the test rod 1, whereby the latter is caused to perform transverse oscillations. These oscillations, it should be well understood, are of very small amplitude and are generally not visible to the eye, and may be compared with the amplitudes of oscillations occurring when, for instance, a freely suspended rod or a bell is struck and emits a tone. As a matter of fact, if alternating current of an audible frequency is supplied to coil 4', the oscillations imparted to test rod 1 can be heard as a tone the same as if it had been struck by a hammer.

The test rod is further secured at its lower end to the movable armature 9 of a measuring element through two wires 7 and 8. The armature 9 lies betwen the two poles of a permanent magnet 10 and similar lateral oscillations are imparted to it by test rod 1 in the plane of the poles of magnet 10. Armature 9 is surrounded by a coil 11 in which an alternating current of corresponding frequency is produced by the transverse oscillations of the armature. This alternating electric energy is amplified by an amplifier 12, through which the system receives its energy from outside, and the amplified voltage is supplied to a measuring instrument 13 and is also fed back to coil 4' of the oscillation generator so that a separate alternating voltage generator may be dispensed with. By a variable condenser 14 the tuning of the oscillating system may be so chosen that different harmonic vibrations are set up. Furthermore, provisions are made to vary the degree of coupling between the amplifier output and the oscillation generator with the aid of a potentiometer 15.

As an oscillation generator a known permanent dynamic exciting system with a low ohmic oscillating coil susbtantially of the same type as is, for instance, used in electrodynamic loudspeakers has proved particularly sucessful. As a receiver an electromagnetic system is preferably utilized which has great mechanical stability and which supplies relatively high alternating voltages even in case of small oscillation amplitudes.

The occurrence of natural oscillations of the wires used for transmitting the oscillations may be suppressed to a great extent by damping means 16 to 19 consisting, for instance, of fibrous material held in supports 42–45 respectively, and arranged in contact with the appertaining wires. In many cases it is sufficient if the wires are damped by bunches of cotton fibres which in the case of higher temperatures may, for instance, be replaced by asbestos wool. The same means may also be employed to advantage in order to ensure a steady position of the test body by applying outside supported bunches of cotton or asbestos wool fibres to the body to be tested at its vibration nodes.

When testing bodies at higher temperatures it is preferable to protect the suspension wires as far as possible and above all the receiver and transmitter against the radiating heat by one or more plate shields 20 and 21 which consist of good heat-insulating material.

The arrangement according to the invention renders also possible the relative measurement of the mechanical inner energy consumption of the work piece during its treatment, since after switching the amplifier in the circuit the amplitude of the electromechanical oscillations gradually increases exponentially with time. The potentiometer 15 may be now so adjusted that the oscillations first are produced at a low intensity. With a small change in inner energy consumption the oscillations either increase to a very much greater intensity if the system closely approaches resonance or they decrease to the zero value as the system departs from resonance. In this manner a change in inner energy consumption and also a change in direction may be determined. If by observing measuring instrument 13 the potentiometer is so regulated in one or the other direction as to always maintain the originally adjusted and observed intensity of oscillation then the regulating directions and the position of the potentiometer 15 are a direct measure for the changes of the inner energy consumption.

The sensitivity of the testing arrangement may be greatly enhanced, particularly in the case of test pieces of considerable mass, if the connection between the systems for producing and receiving the oscillations and the test body is so chosen that the elements transmitting and receiving the oscillations are not additionally loaded by the weight of the test body.

To this end, the test body may be either suspended vertically or horizontally or particularly large test bodies may be also supported on fixed supports at the nodal points of vibration. The oscillations are then transmitted either with the aid of stretched wires or bands secured to the test body or in the case of a horizontal position of the test body by two wire loops in which the test body is suspended at the nodal points of vibration.

In a vertical position an elongated test body is suspended in the simplest case on two wires or in a loop. If the body to be tested is not directly set into oscillation, which in most cases gives rise to difficulties, particularly at high temperatures, the system for setting the test body into oscillation is preferably caused to act laterally upon one suspension wire, whereas the apparatus which converts the oscillations of the body into electrical energy, hereinafter called receiver, is coupled to the other suspension wire.

Instead of a wire any other suitable strand element of negligible mass such as a thread, thin ribbon or the like may also be employed.

A particular advantageous embodiment with a horizontal support of the test body is shown in Fig. 2. Here the test body 22 is carried by two wire loops 23 and 24 preferably at the nodal points of vibration of the test body or in the immediate neighborhood thereof. One end of each wire loop is secured to a fixed support 25 and 26 respectively and the other end is fastened to a plate spring or a steel reed 27 and 28 respectively, the other end of the reeds being fixed in a support. The axially movable element 29 of the system for setting the test body into transverse oscillation acts on the reed 27 and the axially movable member 31 of the receiver 32 is secured to the reed 28. The systems 30 and 32 are only shown schematically and may be constructed in the same manner as the corresponding transmitter and receiver systems shown in Fig. 1. Both systems are electrically coupled with each other in the same manner as in Fig. 1, that is to say through an amplifier 33, a measuring instrument 34, a potentiometer 35 and a condenser 36. The oscillations of the suspension wires are damped at the loop 23 by pads 37 and 38 of fibrous material and at the loop 24 by pads 39, 40, all of these pads being held in supports 46–49 respectively. Also in this case the same applies with respect to the function as described with reference to Fig. 1. Finally, a shield 41 is provided for preventing the radiation of heat from the test body in case the latter is to be investigated during a heat treatment.

In this arrangement the mechanical bias of the system for setting the body into oscillation and that of the receiver is, therefore, avoided to a great extent and very highly sensitive systems may be employed for the production and reception of oscillations. In this case care should only be taken that the system for setting the test body into oscillation does not influence the receiver directly, for instance, electromagnetically.

To avoid with certainty any direct transmission of electrical oscillations from the exciting system to the receiver it may be preferable to arrange between the transmitter and receiver a magnetic shield, for instance, a bundle of stampings. Such a shield prevents with certainty any magnetic reaction between both systems. The direct transmission of mechanical energy may be practically prevented by a correspondingly damped support for the systems and/or by large masses to which the transmitter and the receiver are secured.

The above-described invention which relates both to the support of the test body and to the transmission of oscillation to and from the body is not limited to the embodiments shown but is applicable to all transversal, longitudinal and rotary oscillations.

I claim as my invention:

1. In an arrangement for testing the mechanical oscillation properties of bodies, wires of small mass connected to one end of the test body for supporting the test body so as to be substantially free from external damping influence and an electromagnetic oscillator device mechanically connected with at least one of said wires for producing mechanical oscillations in said test body, and supporting wires connected to the other end of the test body for also supporting the body so as to be substantially free from external damping influence, an apparatus for converting mechanical oscillations into oscillating electrical energy and connected to at least one of said second supporting wires for transmitting the test body oscillations to said apparatus, and an instrument connected to said converting apparatus for perceiving said oscillating electric energy.

2. In an arrangement for testing the mechanical oscillation properties of bodies, wires of small mass connected to one end of the test body for supporting the body so as to be substantially free from external damping influence, an electromagnetic oscillator device mechanically connected with said wires for producing mechanical oscillations in said test body, supporting wires connected to the other end of said test body for also supporting the same so as to be substantially free from external damping influence, an apparatus for converting mechanical oscillations into oscillating electric energy and connected to at least one of said second wires for transmitting the oscillations of said body to said apparatus, an instrument connected to said converter for perceiving said oscillating electric energy, an electric circuit connection between said converter and said electromagnetic oscillator device for feeding oscillating energy into said latter device, and an amplifier and variable capacitive and ohmic resistance elements in said circuit connection for tuning the circuits and coupling the oscillations between said converter and said device.

3. In an arrangement for testing the mechanical oscillation properties of bodies, wires of small mass connected to the test body near one of its ends and in immediate proximity of one of its nodal points for steadily supporting the body so as to be substantially free from external damping influence, means in contact with said wires for damping their natural oscillations, an electromagnetic oscillator device, mechanically connected with at least one of said wires for producing mechanical oscillations in said body, supporting wires of small mass connected to said test body near its other end and in immediate proximity of one of its nodal points for also steadily supporting the body so as to be substantially free from external damping influence, means in contact with said second supporting wires for damping their natural oscillations, an apparatus for converting mechanical oscillations into oscillating electric energy and connected to at least one of said second wires for transmitting the oscillations of said body to said apparatus, an instrument connected to said converter for perceiving said oscillating electric energy, an electric circuit connection between said converter and said electromagnetic oscillator device for feeding oscillating energy into said latter device, and an amplifier and variable capacitive and ohmic resistance elements in said circuit connection for tuning the circuits and coupling the oscillations between said converter and said device.

4. In an arrangement for testing the mechanical oscillation properties of bodies, wires of small mass connected to the test body near one of its ends and in immediate proximity of one of its nodal points for steadily supporting the body so as to be substantially free from external damping influence, soft fibrous damping materials supported in contact with said wires for damping their natural oscillations, an electromagnetic oscillator device, mechanically connected with at least one of said wires for producing mechanical oscillations in said body, supporting wires of small mass connected to said test body near its other end and in immediate proximity of one of its nodal points for also steadily supporting the body so as to be substantially free from external damping influence, soft fibrous damping materials supported in contact with said second supporting wires for damping their natural oscillations, an apparatus for converting mechanical oscillations into oscillating electric energy and connected to at least one of said second wires for transmitting the oscillations of said body to said apparatus, an instrument connected to said converter for perceiving said oscillating electric energy, an electric circuit connection between said converter and said electromagnetic oscillator device for feeding oscillating energy into said latter device, and an amplifier and variable capacitive and ohmic resistance elements in said circuit connection for tuning the circuits and coupling the oscillations between said converter and said device.

5. In an arrangement for testing the mechanical oscillation properties of bodies, wires of small mass connected to the test body near one of its ends and in immediate proximity of one of its nodal points for steadily supporting the body so as to be substantially free from external damping influence, soft fibrous damping materials supported in contact with said wires for damping their natural oscillations, an electromagnetic oscillator device, mechanically connected with at least one of said wires for producing mechanical oscillations in said body, supporting wires of small mass connected to said test body near its other end and in immediate proximity of one of its nodal points for also steadily supporting the body so as to be substantially free from external damping influence, soft fibrous damping materials supported in contact with said second supporting wires for damping their natural oscillations, an apparatus for converting mechanical oscillations into oscillating electric energy and connected to at least one of said second wires for transmitting the oscillations of said body to said apparatus, an instrument connected to said converter for perceiving said oscillating electric energy, an electric circuit connection between said converter and said electromagnetic oscillator device for feeding oscillating energy into said latter device, an amplifier and variable capacitive and ohmic resistance elements in said circuit connection for tuning the circuits and coupling the oscillations between said converter and said device, and means for protecting the test body, the supporting wires and said electromagnetic oscillator and said converter against high temperatures of said test body.

6. In an arrangement for testing the mechanical oscillation properties of bodies, a device for producing mechanical oscillations, thin and flexible thread-like holding means for suspending the test body so as to be substantially free from external damping influence, said means having an extremely small mass as compared with the mass of the test body and being designed to allow the ends of the test body to perform oscillatory movements relative to said device, means connected to said device and to said suspending means for transmitting the oscillations through said suspending means to the test body, an apparatus for converting mechanical oscillations of the test body into oscillating electric energy, an instrument for perceiving said oscillating energy, and thin and flexible thread-like connecting means for transmitting the mechanical oscillations of the test body to said converting apparatus, substantially free from damping influence, said connecting means being in direct connection with said test body and a part of said converting apparatus and having an extremely small mass as compared with the mass of the test body.

FRITZ FÖRSTER.